United States Patent [19]
Suzuki

[11] Patent Number: 5,857,149
[45] Date of Patent: Jan. 5, 1999

[54] MULTIBROADCAST RECEIVER FOR EXTRACTING DESIRED BROADCAST INFORMATION BASED ON AN IDENTIFICATION CODE

[75] Inventor: Hiromichi Suzuki, Sagamihara, Japan

[73] Assignee: Kabushiki Kaisha Media Marketing Network, Tokyo, Japan

[21] Appl. No.: 586,631

[22] PCT Filed: May 26, 1995

[86] PCT No.: PCT/JP95/01017

§ 371 Date: Jan. 18, 1996

§ 102(e) Date: Jan. 18, 1996

[87] PCT Pub. No.: WO95/33318

PCT Pub. Date: Dec. 7, 1995

[30]   Foreign Application Priority Data

May 27, 1994  [JP]  Japan ..................................... 6-115615
Feb. 22, 1995  [JP]  Japan ..................................... 7-33602

[51] Int. Cl.[6] .................................................. H04B 1/18
[52] U.S. Cl. .......................................... 455/186.1; 455/45
[58] Field of Search ................................. 455/45, 89, 90, 455/186.1, 186.2, 185.1, 230, 4.1, 4.2, 6.3, 2

[56]     References Cited

U.S. PATENT DOCUMENTS 3,696,297  10/1972  Otero ........................................ 455/45
5,128,752  7/1992  Von Kohorn ................................ 455/2
5,210,611  5/1993  Yee et al. ............................... 455/186.1
5,214,792  5/1993  Alwadish ............................... 455/186.1
5,371,493  12/1994  Sharpe et al. ......................... 455/186.1
5,491,838  2/1996  Takahisa et al. .......................... 455/45

FOREIGN PATENT DOCUMENTS

1-115232  8/1989  Japan ................................ H04H 9/00
4-14918  1/1992  Japan ................................ H04H 1/00
5-83216  4/1993  Japan ................................ H04H 1/00

Primary Examiner—Reinhard J. Eisenzopf
Assistant Examiner—Sam Bhattacharya
Attorney, Agent, or Firm—Finnegan, Henderson, Farabow, Garrett & Dunner, L.L.P.

[57]      ABSTRACT

A multibroadcast receiver 1 comprises a stereo receiving unit 4, an extractor 7 for taking out information about an identification code related to the contents of a broadcasting program and a necessary character code or the like from a data signal in a broadcasting radio wave, a print unit 10 for recording the information extracted from the extractor 7 thereon, an insert portion 12 for inserting a card 11 therethrough, a reader 13 for reading a predetermined identification code recorded on the card 11 inserted in the insert portion 12, and a controller 8 for checking the identification code on the card 11 against the identification code extracted from the extractor 7 and recording by the print unit 10 the necessary information taken out of the data signal on the card 11 in accordance with the result of check. Further, the controller 8 checks data inputted through a selectively-provided key input unit 16 against predetermined data taken out from the extractor 7.

34 Claims, 6 Drawing Sheets

MULTIBROADCAST RECEIVER FOR EXTRACTING DESIRED BROADCAST INFORMATION BASED ON AN IDENTIFICATION CODE

TECHNICAL FIELD

The present invention relates to a multibroadcast receiver with a card, and to a multibroadcast receiving system capable of more effectively utilizing a radio massmedia system with a card as a medium between the audience side and the broadcasting station side.

BACKGROUND ART

A radio massmedia system using a normal broadcast receiver such as a television, a radio or the like basically provides information through a unilateral or unidirectional communication made from a broadcasting station or a program sponsor (hereinafter called "broadcasting station side") to an audience/listener (hereinafter called "audience side"). It is necessary for the broadcasting station side to continue to send information to many and unspecified persons or parties at all times while whether or not the viewers are watching and listening in fact, remains unknown. Further, the audience side must select necessary information from random and massive amounts of information given by broadcasting. Therefore, the degree of information transfer to the audience side can be actually said low. The broadcasting station side repeatedly sends increasingly massive amounts of information to the audience side to overcome the low degree of information transfer, thereby causing a vicious circle that a further increase in labors or trouble occurs to select information. Thus, the broadcasting station side incurs a result that even when the amount of information to be given is increased, commercial effects which are commensurate with that cannot be achieved.

A broadcast for transmitting a digital data signal using a multibroadcasting radio wave or PCM broadcasting radio wave used for a television and a radio has been recently put to practical use. This type of broadcast is of a system capable of simultaneously transmitting additive information based on the digital data signal together with a general broadcasting program and has a potential that a problem developed due to the unidirection of the aforementioned information transfer can be reduced by using such additive information.

The present invention has been made from the foregoing points of view, and it is an object of the present invention to solve the aforementioned problems developed in radio mass media, i.e., the increase in trouble incident to the selection of information and the decrease in commercial effects due to the reduction in the degree of information transfer by effectively utilizing a multibroadcasting system.

DISCLOSURE OF THE INVENTION

In order to achieve the above object, the present invention provides a multibroadcast receiver for including an identification code related to the contents of a broadcasting program in a data signal carried by an additive-information radio wave in a multibroadcasting radio wave and extracting information desired by an audience from the data signal, based on the identification code, comprising:

means for extracting the identification code related to the contents of the broadcasting program from the data signal;

a portion for inserting therethrough a card with a predetermined identification code recorded thereon;

means for reading the identification code from the card inserted into the insert portion;

recording means for writing necessary information included in the data signal into the inserted card; and control means for checking the identification code extracted from the data signal against the identification code read from the card and controlling the recording means in accordance with the check result.

Further, the present invention provides a broadcast receiving system comprising:

a broadcasting station for including an identification code related to the contents of a broadcasting program in a data signal carried by an additive-information radio wave in a multibroadcasting radio wave and broadcasting the same;

a card having the identification code recorded thereon in advance;

a multibroadcast receiver having an insert portion for inserting the card therethrough and constructed so that information necessary to identify the contents of the broadcasting program is extracted from the data signal, based on the identification code recorded on the card and is recorded on the card; and card recovery locations scattered within a broadcasting area so as to recover the card;

whereby high value-added information or physical services such as a premium, present, etc. are provided at the card recovery locations based on the records on the card, while the records on the card which are collected through the card recovery locations are used for statistical processing.

The multibroadcast receiver and multibroadcast receiving system can be used as described below and can reduce labors made when the audience side selects information, according to the way of using them.

A card on which an identification code corresponding to "Artist name", for example, is recorded is inserted into the insert portion of the multibroadcast receiver. When the card is inserted into the insert portion, the reading means reads the identification code from the card. The extracting means of the multibroadcast receiver takes out the identification code (which is transmitted so as to be included in a broadcasting radio wave as a data signal in unison with a piece of music being on air by a broadcasting station) corresponding to the artist name from the data signal in the multibroadcasting radio wave. The control means checks the identification code read from the card against the identification code taken out of the data signal in the radio wave. When the identification codes coincide with each other, the usage of the multibroadcast receiver and the multibroadcast receiving system is made possible that, for example, information (e.g., entertainment information about a singer, words of a song, etc.) about music being on air at that time from the data signal carried by the additive-information radio wave along with the identification code of the artist name is recorded on the card inserted into the insert portion (as an alternative to the recording of the information on the card, a character code sent as a data signal may be printed in the form of characters or magnetically recorded).

Similarly, a card having a predetermined identification code obtained by combining a "traffic information program code" and a "by-geographic area/by-route code" together is inserted into the insert portion. A traffic information program included in the data signal in the multibroadcasting radio wave is checked against an identification code related to a by-geographic area/route to thereby limitatively receive traffic information about a predetermined area only. As a result, the received traffic information can be recorded on the card. When the audience is scheduled to buy certain merchandise, a card having an identification code related to the merchandise, e.g., "merchandise commercial classification code" is inserted into the insert portion. The above-"merchandise commercial classification code" is included in the data signal in the multibroadcast radio wave so as to correspond to a broadcasted commercial. Similarly to the above, the identification code taken out by the extracting means is checked against the identification code read by the reading means. When they coincide with each other, the usage of the multibroadcast receiver and the multibroadcast receiving system is made possible that, for example, detailed information about the usage, price and selling locations of merchandise advertised at that time from the data signal carried by the additive-information radio wave along with the "merchandise commercial classification code", is recorded on the card.

Namely, when they are used in this way, the audience can automatically take out his/her desired information from random and massive amounts of information by simply selecting a card having an identification code that satisfies his/her own desire and inserting it into the multibroadcast receiver. It is therefore possible to save labors or efforts required to select the information. Since the taken-out information is recorded on the card, the audience can carry the information and re-use it whenever they like.

On the other hand, if a predetermined identification code fit for the purpose of the broadcasting station side is recorded on a card and the card is distributed to the audience side, then the broadcasting station side can substantially broadcast to a limited audience. One example will be described. A program or advertisement sponsor distributes cards each having an identification code corresponding to its own company, e.g., a "sponsor code" recorded thereon, to the audience side in advance. The sponsor ties up with the broadcasting station so that the "sponsor code" is broadcasted simultaneously with a program or commercial thereof with the "sponsor code" included in a data signal. Thus, the multibroadcast receiver and the multibroadcast receiving system can provide the usage that when both identification codes coincide with each other in the same manner as described above, the sponsor provides only the audience having the cards with advantageous information such as new-product information, a discount price, the term of a discount sale, etc. Namely, the broadcasting station side can restrict suitable commercials only to persons who often watch the program or commercial for the sponsor or to persons who use the sponsor's goods habitually.

Similarly, for example, such contents as a man in his twenties whose hobby is skiing are coded and recorded on a card as a "age/sex/hobby limitation code". The broadcasting station side distributes the card to the audience side in advance. Thus, the multibroadcast receiver and the multibroadcast receiving system can provide the usage that, for example, a company for selling ski goods cooperates with a broadcasting station so that the broadcasting station broadcasts a commercial about the ski goods along with a data signal including the above identification code therein. Namely, since the company can advertise the ski goods intended for only persons who consider skis as hobbies, a higher commercial effect can be expected.

Further, cards having a "XX fan-club membership code" and a "XX company staff code" recorded thereon as identification codes are distributed to members of a fan club or staffs of a special enterprise in advance. Thereafter, detailed information is recorded on the corresponding card through the multibroadcast receiver in which the card having the identification codes has been inserted. In some cases, the reception and reproduction of a general broadcast can be controllably constituted. Thus, the broadcasting station side can substantially realize a private broadcast.

In using the multibroadcast receiver according to the present invention, the broadcasting station side may tie up with a number of convenience stores in a broadcasting area so as to provide card recovery locations. Namely, a file server is disposed in each card recovery location so that information unable to be directly recorded or recorded on a card is secondarily recorded or printed out on the card by using the file server.

Namely, for example, a "pamphlet desired code", a "by-geographic area/by-route code", etc., each of which indicates an output instruction made to the server, are set so as to be included in a data signal carried by an additive-information radio wave in a multibroadcast radio wave. When a certain program or commercial is received based on a predetermined identification code recorded on a card and necessary information is taken out from the data signal so as to be recorded on the card again, the aforementioned "pamphlet desired code" and "by-geographic area/by-route code" are also recorded on the same card along with the necessary information. Next, the audience brings the card to its corresponding card recovery location where the "pamphlet desired code" and "by-geographic area/by-route code" are read by a suitable reader. Thereafter, a merchandise pamphlet and a road map displayed with color images, for example, are outputted from the corresponding file server.

Thus, the card on which the identification code related to the broadcasting program is recorded from the data signal in the multibroadcast radio wave by the multibroadcast receiver, can be regarded as evidence (audiovisual certification) that the audience was really watching or listening to a broadcasting program. Thus, if the card is recovered by a suitable method such as mailing or the like and the contents recorded on the card are confirmed at the card recovery location, then high value-added information, e.g., valuable physical service such as a premium, a sample, a benefit, a square piece of fancy paper, a concert ticket, etc. can be easily offered only to the persons who was really watching or listening to the broadcasting program.

Namely, when a certain sponsor invites an application to the audience for providing the audience with a sample or present during a broadcasting program, the sponsor cannot exclude persons who do not really watch or listen to the program from making applications or one person from making a plurality of applications. However, the sponsor can strictly select one of applicants by using a card as an audiovisual certification.

Another advantage of the card that serves as the audiovisual certification is that various data recorded on the card can be used for an audience trend survey (such as an audience rating of a program, seizing of distribution of an audience age group, an audience preference survey or the like).

The following usage is also made possible if an external inputting means is further added to the above multibroadcast receiver and the control means performs control for checking data input from the external inputting means against predetermined data included in a received data signal and recording necessary information taken out of the data signal on a card in accordance with the result of check.

Namely, for example, a broadcasting station provides quizzes through a broadcasting program for a radio or television and sends a correct answer to the each quiz through a data signal. Thus, the usage is made possible that the audience checks his answer input through the external inputting means against the correct answer to the quiz and the result of check is recorded on a card for display.

In doing so, various uses that, for example, the audience can recognize a correctness or incorrectness relative to the answer to the set quiz substantially in real time and the audience can bring the card to the card recovery location to receive the premium, can be realized, thereby making possible to provide a very interesting broadcasting program capable of arousing the interest of the audience.

Further, the following usage is also made possible, if a write instruction signal and a read instruction signal for the recording means and the reading means are included in a data signal carried by an additive-information radio wave sent from a broadcasting station; and the control means controls the recording means and the reading means in accordance with the write and read instruction signals to perform the reading and writing of information from and into a card.

Namely, after a quiz has been set through a broadcasting program, the broadcasting station sends the write instruction signal after the elapse of a predetermined time interval so that the multibroadcast receiver temporarily records an audience answer issued from the external inputting means on the card. Next, the broadcasting station sends a correct answer to the quiz and transmits the read instruction signal to allow the reading means to read the audience answer so as to be checked against the above correct answer.

In doing so, the broadcasting station side can actively restrict the time (answer reception time) between setting and answering the quiz. Thus, the broadcasting station side can provide a quiz program at quick tempo in unison with the program progress. Further, after an audience answer issued from the external inputting means has been temporarily recorded on a card by a certain multibroadcast receiver, the audience brings the card to other multibroadcast receiver where the correctness or incorrectness relative to the answer to the quiz can be confirmed. Thus, the usage is made possible that the audience makes an answer to a quiz at his/her own house in the morning and the correctness or incorrectness relative to its answer is confirmed at the workplace in the noon recess.

The above usage can be applied to the guess of the issue about matches such as baseball, basket, soccer, etc., replies submitted to a questionnaire and applications for a premium, a ticket, various samples, a benefit, etc., as well as to the setting of quizzes. Alternatively, the usage can be applied to an audience entry-type game by suitably varying the contents of a message printed on a card based on data given from an external inputting means. Further, various uses such as a radio"television shopping program, an educational program, etc. can be considered.

The following are considered as the recording of the information on the card according to the above usage. Namely, the information is magnetically or electrically recorded on a pet card or an IC card. Alternatively, the information is printed out onto a card such as paper by using a callular code, a bar code or characters. The former is desirable in that the information storage capacity per unit area of the card can be made great, whereas the latter is desirable in that the manufacturing cost of the card is cheap and the contents recorded on the card are visible to the naked eye.

BEST MODE FOR CARRYING OUT THE INVENTION

[First embodiment]

Figure 1:
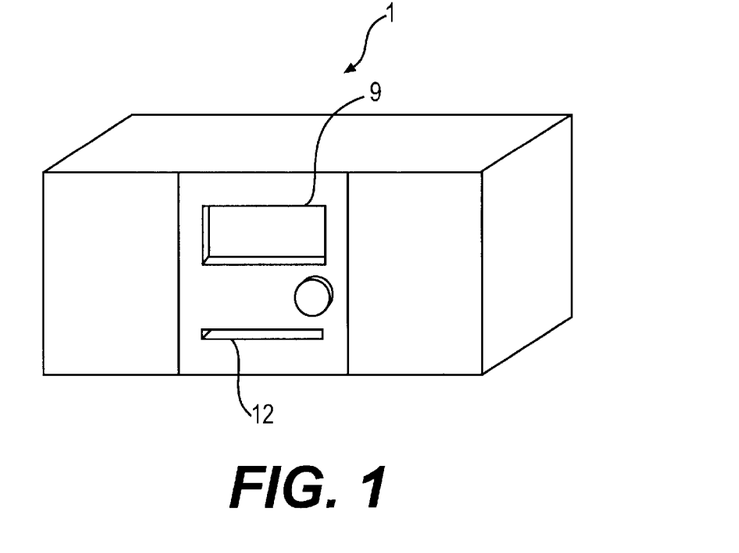
FIG. 1 is a perspective view showing a first embodiment of a multibroadcast receiver according to the present invention.
Figure 2:
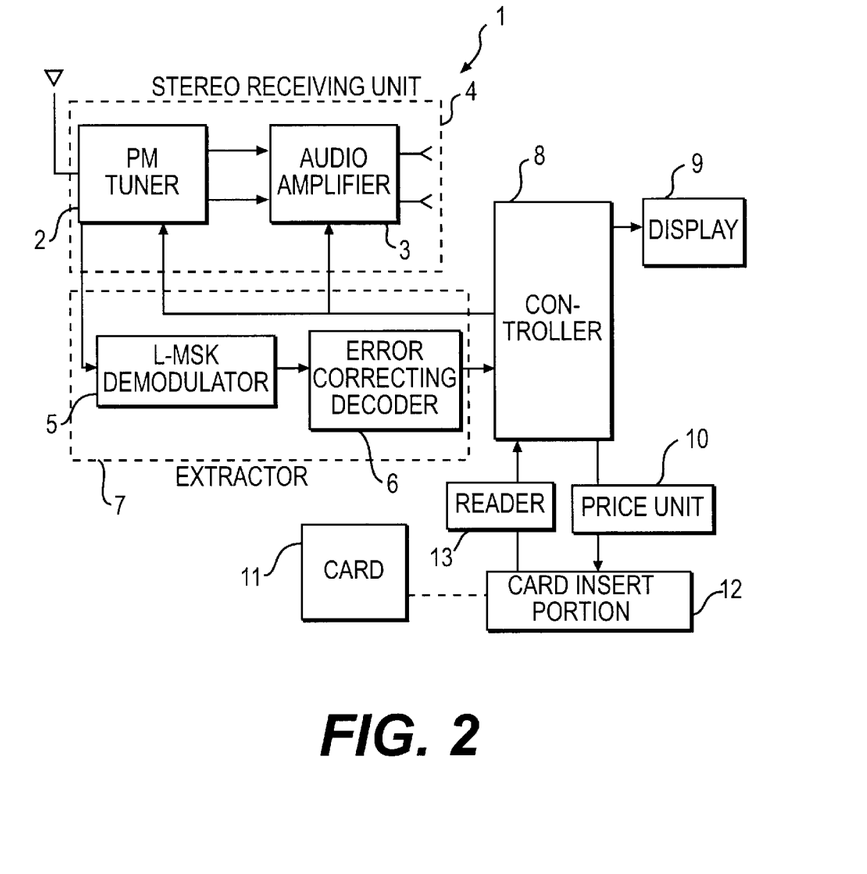
FIG. 2 is a block diagram showing the first embodiment according to the present invention.

A first embodiment according to the present invention will be described with reference to FIGS. 1 through 5. As shown in FIGS. 1 and 2, a multibroadcast receiver 1 according to the present invention comprises a stereo receiving unit 4, an extractor 7, a controller 8, a display 9, a print unit 10, an insert portion 12 for inserting a card 11 therethrough, a reader 13 and an unillustrated memory.

The stereo receiving unit 4 receives a broadcasting wave by an FM tuner 2 and outputs sound or voices from a speaker through an audio amplifier 3. The extractor 7 takes out necessary data included in a binary data signal carried by an additive-information radio wave in the multibroadcasting wave. The extractor 7 comprises an L-MSK demodulator 5 (Level Controlled Minimum Shift Keying; digital modulation system for varying a multilevel according to a modulation factor of a stereo difference signal) and an error correcting decoder 6. The controller 8 processes an identification code related to the contents of a broadcasting program extracted from the extractor 7, various control signals and signals inputted from other peripheral devices, converts them into predetermined character codes or control codes and performs necessary various controls on peripheral devices. The display 9 uses a liquid crystal display element and suitably displays necessary information under the control of the controller 8. The print unit 10 is composed of a thermal printer and receives necessary data from the controller 8 so as to print it on the card 11 inserted into the insert portion 12. The insert portion 12 is used to insert the card 11 to be described later therethrough and is selectively provided with a sensor for detecting whether the card 11 exists. The reader 13 is composed of an optical reader, which reads an identification code on the card 11 in the insert portion 12 and sends it to the controller 8.

Figure 3:
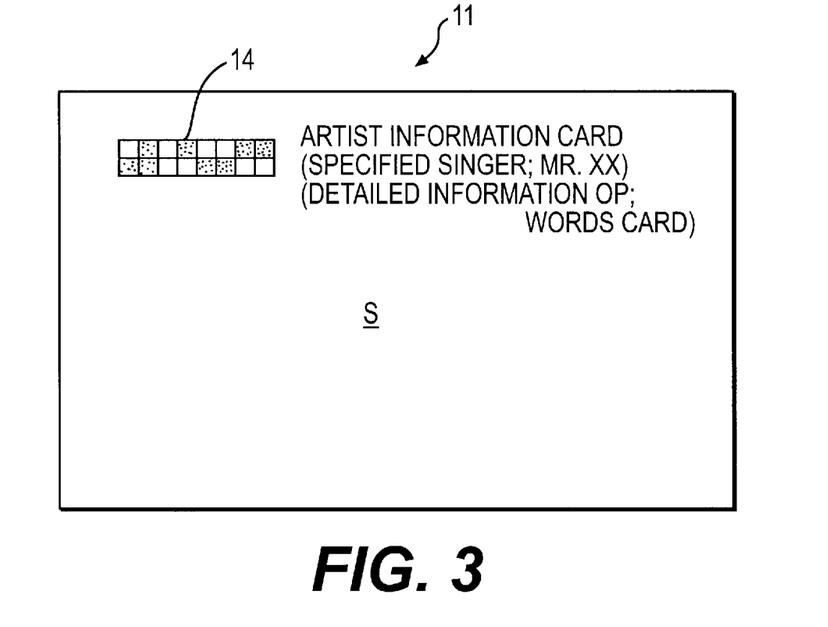
FIG. 3 is a view showing a state prior to the use of a card employed in the first embodiment.

As shown in FIG. 3, the card 11 is shaped in the form of a thin plate-like card printable by the print unit 10. A hexadecimal 4-digit caller code 14 is printed on an upper stage of the card 11 as an identification code. The caller code 14 is read when inserted into the insert portion 12 and is stored in an unillustrated memory by the controller 8. Further, a recording space S for printout of the print unit 10 is provided at a lower stage of the card 11. The recording space S is of a recording space for printing characters (such as a program name, a quiz name, the data and hour of a broadcast) related to the contents of a program taken out of a data signal in the broadcasting wave and caller codes 15 indicated by coded identification codes, such as instructions for outputting words relative to a file server located in a card recovery location, etc.

Figure 4:
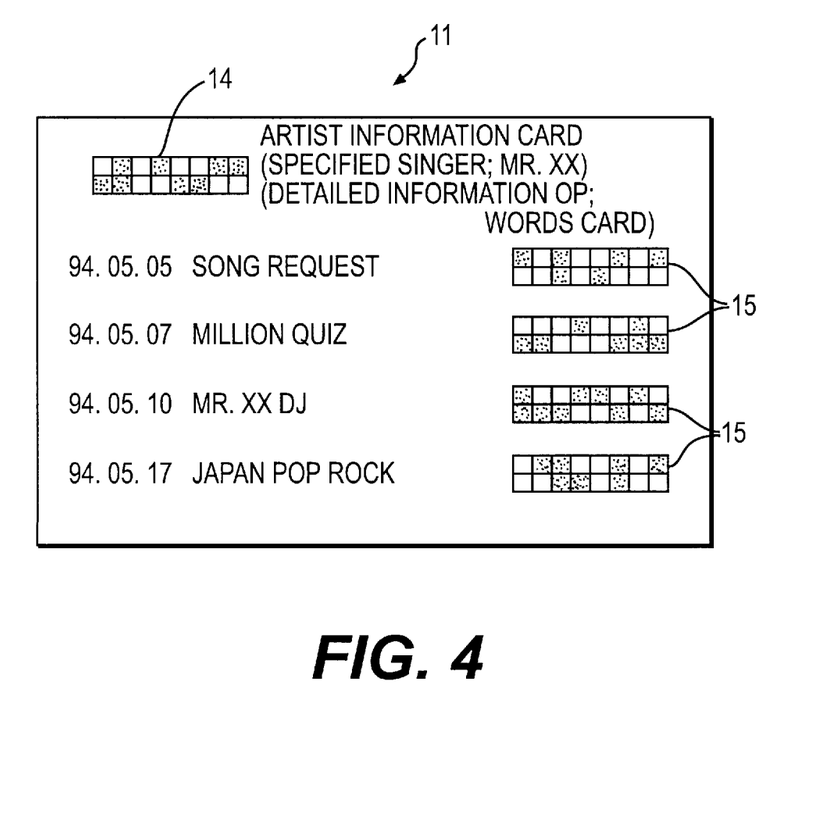
FIG. 4 is a view showing a state subsequent to the use of the card employed in the first embodiment.
Figure 5:
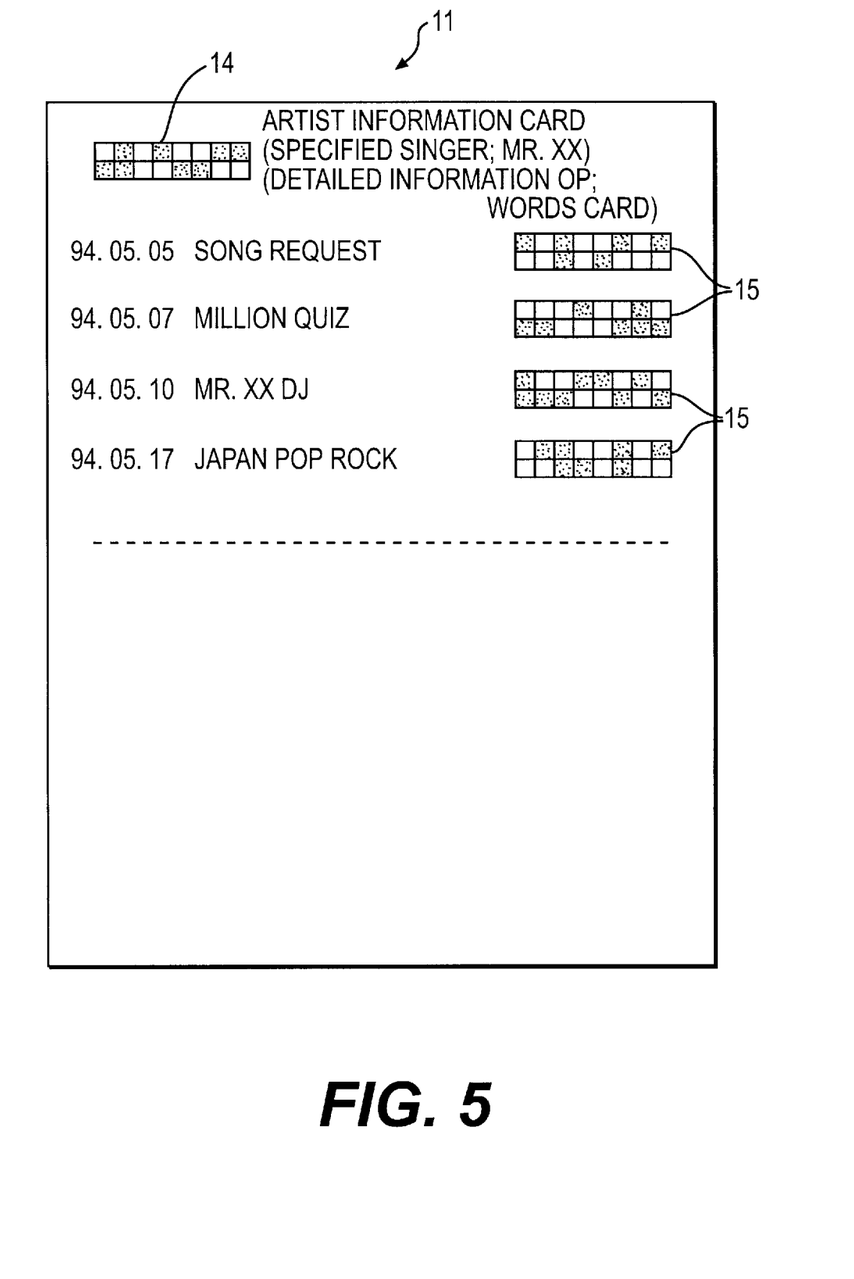
FIG. 5 is a view showing a modification of the card employed in the first embodiment.
Figure 6:
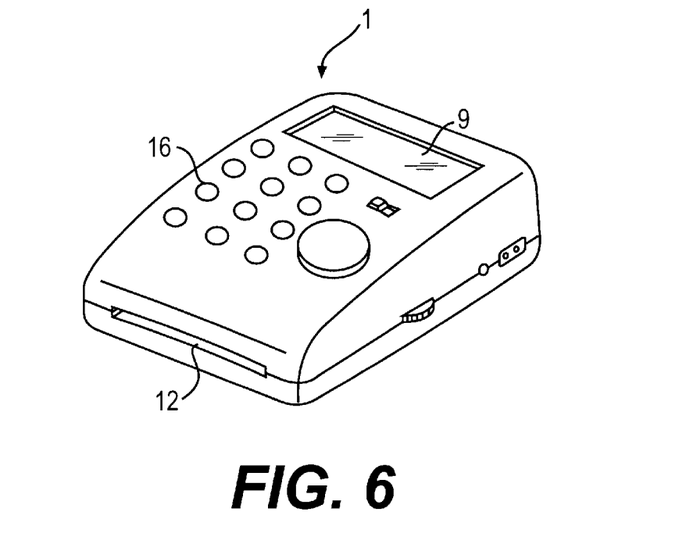
FIG. 6 is a perspective view showing a second embodiment of a multibroadcast receiver according to the present invention.
Figure 7:
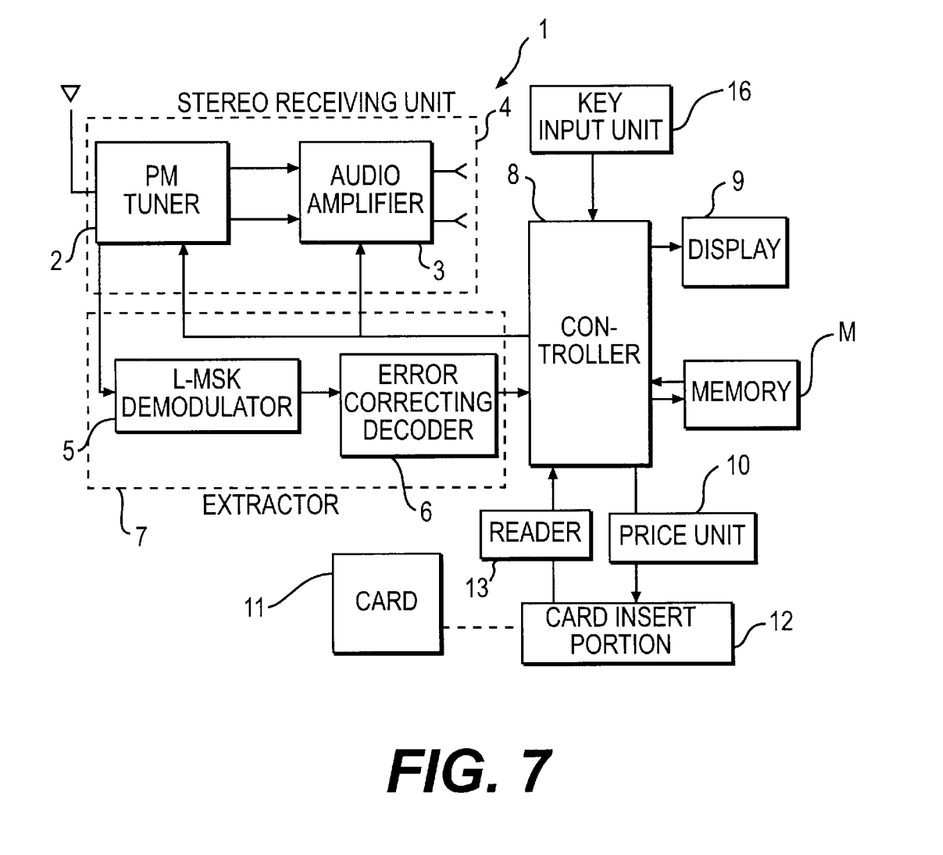
FIG. 7 is a block diagram showing the second embodiment according to the present invention.

Although not shown in FIG. 3 nor 4, a postcard form or format having a space for entering an address and characters is printed on the reverse side of the card 11 so as to facilitate mailing the card from an audience to a broadcasting station or vice versa. The size of the card 11 is set to the order of that of the postcard as shown in FIG. 5. About the half of the card 11 is inserted into the insert portion 12, whereas the other half may be used as a space for entering characters or an advertisement space for a sponsor.

Incidentally, the caller codes 14 and 15 may be printed on the card 11 by magnetic ink or special ink so as to prevent unauthorized usage of the card 11. The caller codes 14 and 15 are illustrated as the 4-digit codes. However, they are suitably set as 5-digit or more codes according to the magnitude of an audible broadcasting area, the number of audience or the quantity of information to be included.

The way of using the multibroadcast receiver 1 will now be described. An identification code corresponding to a certain specific singer is printed on the card 11 as the caller code 14 in advance.

When the card 11 is inserted into the insert portion 12 in a state in which a power switch (not shown) is being turned ON, the reader 13 located in the position corresponding to the card 11 reads the caller code 14 and sends the result of reading to the controller 8. The controller 8 converts the input into checkable identification data by referring to a conversion table and the identification data is suitably stored in the memory.

The extractor 7 takes out an identification code related to the contents of a broadcasting program included as header information indicative of a data signal in the multibroadcasting wave and sends it to the controller 8. The controller 8 checks the identification code supplied from the extractor 7 against the identification code stored in the memory. When they coincide with each other (they may be made inconsistent with each other according to the condition), the controller 8 receives predetermined data in a general-purpose data area, which is sent subsequently to the header, from the extractor 7 and causes the print unit 10 to print the data within the recording space S on the card 11 in the form of the characters and the caller code 15.

Thus, when the card 11 is set in the insert portion 12 of the multibroadcast receiver 1, the audience can automatically print necessary data on the card 11 when a piece of music sung by a specific singer is played on air. Further, the audience refers to the card 11 at the card recovery location as needed and acquires entertainment information about the specific singer or words from the file server based on the caller code 15. In the illustrated embodiment, the contents recorded on the card 11 include characters for identifying a program and instructions for outputting words to the file server. However, character codes indicative of words may be included in the general-purpose data area so that the words are directly set out on the card 11.

The data signal employed in the present embodiment is constructed with a bit string composed of, for example, 16 Kbps as one group and includes identification codes related to the contents of a broadcasting program, numerical data, text data, graphic-element (mosaic set for map drawing) data, other additive information, and the like are included in an information word area of 6.83 Kbps excluding a check word area of 9.17 Kbps. The data signal is multiplexed at the broadcasting station so as to be transmitted synchronously with the progression of a normal broadcasting program.

[Second embodiment]

A second embodiment will now be described with reference to FIGS. 6 through 10. As is understood from FIGS. 6 and 7, a key input unit 16 used as an external inputting means is added to the second embodiment in addition to the structure of the first embodiment. In the figure, the key input unit 16 is directly mounted on the upper surface of a multibroadcast receiver 1. However, the key input unit 16 may be connected to a controller 8 so as to be able to perform remote control using infrared rays, a weak radio wave, etc. Incidentally, a memory M is simply shown in the second embodiment although not shown in the first embodiment.

Figure 8:
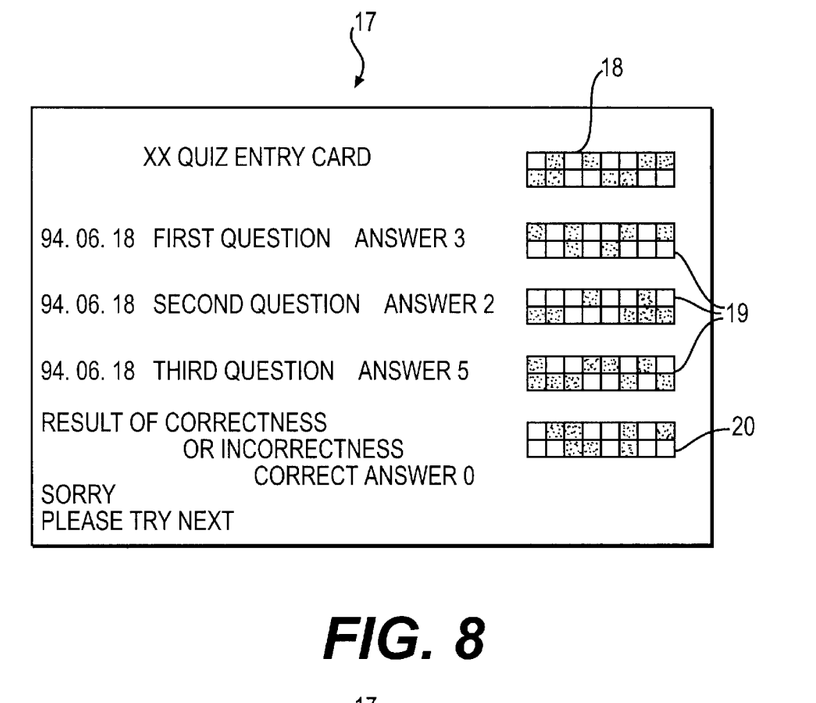
FIG. 8 is a view showing a card employed in the second embodiment shown in FIG. 6.
Figure 9:
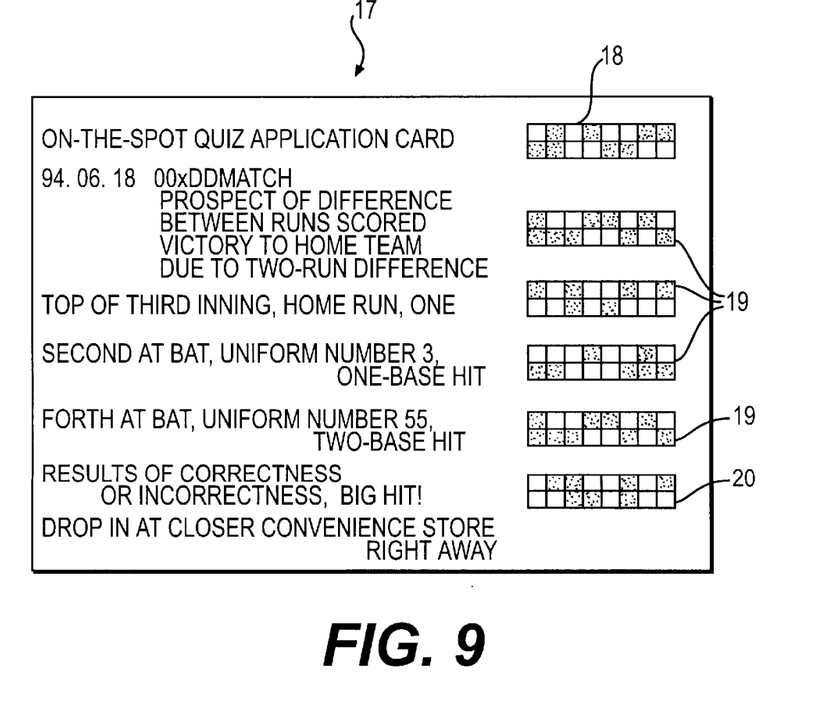
FIG. 9 is a view showing another example of the card employed in the second embodiment.

As shown in FIGS. 8 and 9, a card 17 is basically identical to the card 11 employed in the first embodiment. A caller code 18 equivalent to the caller code 14 employed in the first embodiment is recorded on an upper stage of the card 17. A recording space (not shown) for printing of a print unit 10 is provided at a lower stage of the card 17 in the same manner as the first embodiment. When the card 17 is inserted into an insert portion 12, caller codes 19 corresponding to the caller codes 15 employed in the first embodiment are printed on the recording space. The caller codes 19 include data input from the key input unit 16 as will be described later. A caller code 20 provided at the lowest stage of the recording space will be described later.

Figure 10:
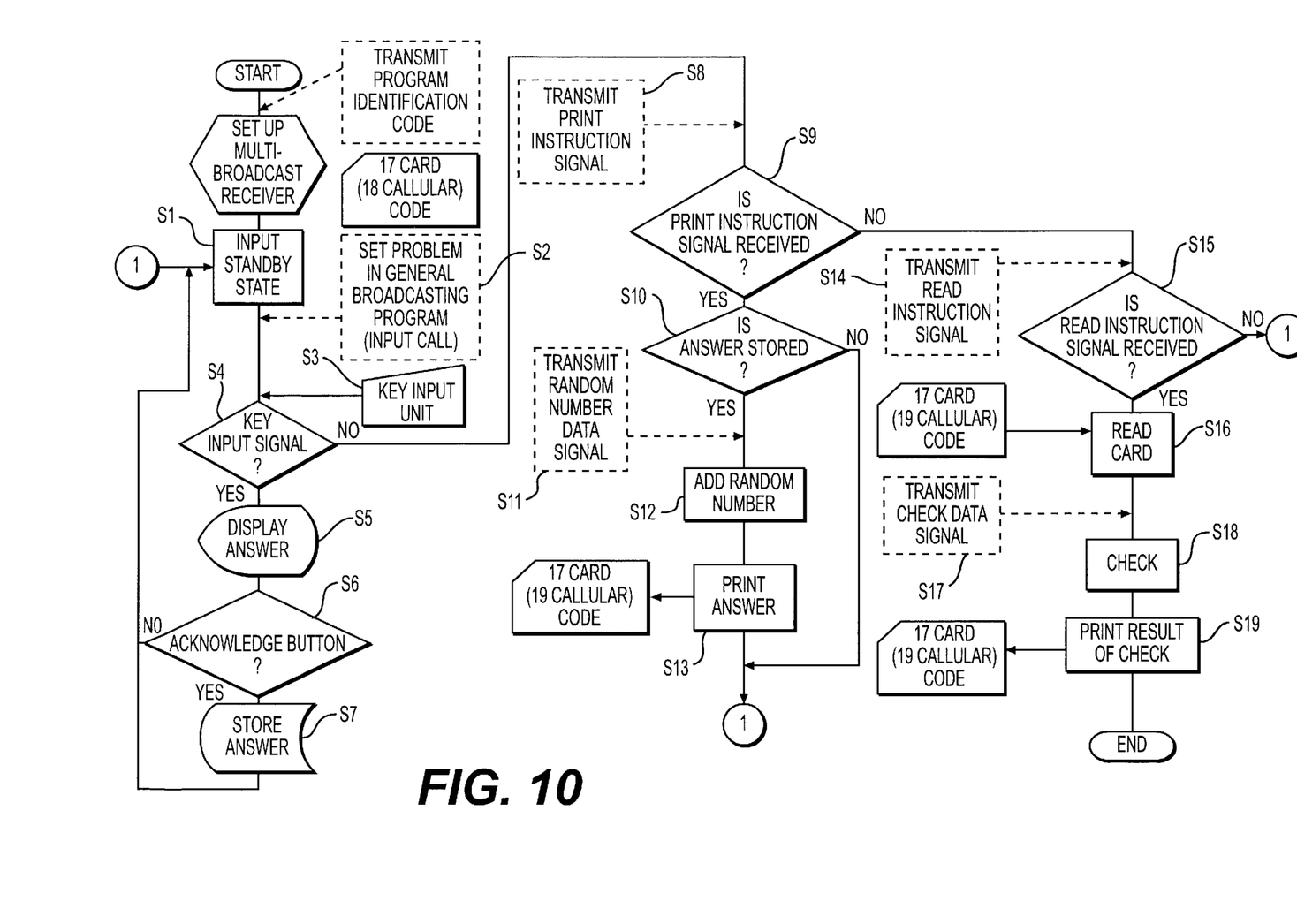
FIG. 10 is a flowchart for explaining one example of how to use the second embodiment.

One example of the way of using the second embodiment will now be described with reference to FIG. 10. A program identification code for identifying a broadcasting program called "XX quiz" is printed on the card 17 in advance as the caller code 18. When the card 17 is first inserted into the insert portion 12 in an ON state of a power switch as the preceding stage, a reader 13 located in a position corresponding to the card 17 reads the caller code 18 and sends the result of reading to the controller 8. The controller 8 converts the read information into checkable identification data by using a conversion table or the like and allows the converted data to be stored in the memory M. Further, the controller 8 recognizes that the data is of identification data for a quiz program and enters into an external input reception mode.

An extractor 7 takes out a program identification code (corresponding to the identification code associated with the "XX quiz" in the present embodiment) related to the contents of a broadcasting program included as a header for a data signal in a multibroadcasting wave and sends it to the controller 8. The controller 8 checks the identification code taken out from the extractor 7 against the identification code stored in the memory M. When they coincide with each other, the controller 8 suitably performs receiver control (setup) such as an increase in volume or sound level and is thereafter brought into an input standby state S1.

The proceeding of the controller 8 to the input standby state S1 can be executed by various methods. The controller 8 may be manually shifted to the input standby state S1 by an additionally-provided switch, for example. Alternatively, the controller 8 may be automatically shifted to the input standby state S1 simultaneously with the turning ON of the power. Further, an instruction signal for a shift to an external input reception mode is included in predetermined data within the general-purpose data area, which is sent subsequently to the header. When the shift instruction signal is taken out through the extractor 7 subsequently to the header in this state, the controller 8 may be caused to control the shift to the input standby state.

Next, when the controller 8 is in the input standby state S1, for example, a quiz is set during a broadcasting program and an audience is urged to answer by numbers using the key input unit 16 (S2). When, for example, "3" in the key input unit 16 is pressed (S3), it is checked whether "3" is a key input signal (S4) and "3" is displayed on the display 9 as an answer (S5). When a confirmation or acknowledge button of the key input unit 16 is next depressed (S6), the data indicative of "3" is stored in the memory 15 through the controller 8 (S7) and the controller 8 returns to the input standby state S1.

After the elapse of a predetermined time (i.e., after a time required to restrict the answer to the quiz has elapsed), a broadcasting station sends a print instruction signal (write instruction signal) (S8). When the print instruction signal is taken out from the data signal in the multibroadcasting wave through the extractor 7 in the input standby state S1 (S9), it is checked whether the record of the answer stored in the state S7 exists (S10). If the answer is found exist at S10, then random-number data "1" sent subsequently to the print instruction signal from the broadcasting station is added to the data indicative of "3" taken out from the memory 15 (S11 and S12). As shown in FIGS. 3 and 4, the character information sent subsequently to the random-number data from the broadcasting station and the caller code 19 indicative "4" are printed onto the card 17 (S13). When the above printing is finished, the controller 8 is brought into the input standby state (S1) again and the above operation is similarly repeated in unison with the progress of the broadcasting program.

Thereafter, the broadcasting station may send a read instruction signal to the reader 13 (before the completion of a program or during other program after the completion of the program or during the sa week later a broadcasted a week later according to the contents of a quiz or the like) (S14). When the read instruction signal is received through the extractor 7 (S15), the controller 8 controls the reader 13 to read "4" of the caller code 19 printed on the card 17 (S16). The controller 8 receives a check or collation data signal indicating "4" (i.e., a correct answer) sent after the read instruction signal from the broadcasting station therein (S17) and checks it against the caller code 19 read at S16 (S18). The result of check is printed on the lowest stage of the recording space on the card 17 in the form of characters and a predetermined caller code 20 (S19), then the routine procedure is finished. Incidentally, the characters and the caller code 20 indicating the result of check (correctness or incorrectness relative to the answer) may be variously stored and suitably outputted by referring to the conversion table. Alternatively, they may be taken out from a data signal carried by an additive-information radio wave and then printed as necessary.

Thereafter, the audience brings the card 17 to card recovery locations scattered within a broadcasting area. Further, the audience allows a suitable reader disposed at each card recovery location to read the caller code 20 or presents characters indicative of the correctness or incorrectness relative to the answer to an employee, whereby the audience accepts physical services such as gifts, benefits, merchandise coupons, tickets, etc.

The second embodiment shows, as an example, the case where after the answer (S3) has been issued from the key input unit 16, the check data signal indicative of the correct answer is sent (S17). However, the following procedure may be also considered. Namely, a check data signal is transmitted and stored in the memory M simultaneously with the setting of the quiz (S2). Further, a count-down start signal is sent to count the time that elapsed from the setting of a problem, on the multibroadcast receiver 1 side. After the elapse of a predetermined time interval, the answer given from the key input unit 16 is automatically checked against the check data stored in the memory M and the result of check is printed on the card 17. This can prevent such accidents that the state of a radio wave becomes worse after the setting of a quiz so that a print instruction signal cannot be received. Therefore such a problem as, "Although the quiz has been set, the time required to restrict the reception of an answer cannot be reliably set off" will be eliminated.

Even if the broadcasting station does not actively transmit the print instruction signal and the read instruction signal as in the second embodiment, the audience can check the answer to the quiz program, which is inputted by the use of the external inputting means 16, and can record the result of check on the card 17.

Briefly described, namely, the card 17 having the identification code for the quiz program is inserted into the insert portion 12 of the multibroadcast receiver 1 to thereby bring the controller 8 into the external input reception mode. The broadcasting station sends the identification code for the quiz program as header information and transmits it inclusive of the data indicative of the correct answer to the quiz within the general-purpose data area, which is sent subsequently to the header. The extractor 7 takes out the identification code related to the contents of the broadcasting program from the header information of the data signal in the multi-broadcasting radio wave, and sends the code to the controller 8. The controller 8 checks the identification code taken out from the extractor 7 against the identification code stored in the memory M. When they coincide with each other, the controller 8 receives therein the data indicating the correct answer within the general-purpose data area sent subsequently to the header through the extractor 7 and checks the data against the data inputted from the key input unit 16. Finally, the result of check is printed onto the recording spaces on the card 17 through the print unit 10.

INDUSTRIAL APPLICABILITY

With the use of a multibroadcast receiver and a multibroadcast receiving system according to the present invention, as has been described above, a program and the contents of the program can be automatically selected based on an identification code recorded on a card so that necessary information can be recorded on the card. Therefore, the labor of selecting information can be saved and audio-visualized information can be easily stored. Further, the program can be broadcasted under the substantial limitations to an audience by distributing cards fit for the purpose of the broadcasting station side to the audience in advance. The recording of the information on the card can be utilized not only as an audiovisual certification for a broadcasting program but also as a statistical process such as an audience rating, a preference research of an audience, or the like. Since the audience can answer to a quiz or a questionnaire or the like by using an external inputting means, a more interesting program can be provided. Thus, both the audience side and the broadcasting station side can more effectively utilize the radio mass media.

I claim:

1. A multibroadcast receiver for including an identification code related to the contents of a broadcasting program in a data signal carried by an additive-information radio wave in a multibroadcasting radio wave and extracting information desired by an audience from the data signal, based on the identification code, comprising:

extracting means for extracting the identification code related to the contents of the broadcasting program from the data signal;

an insert portion for inserting therethrough a card with a predetermined identification code recorded thereon;

reading means for reading the identification code from the card inserted into said insert portion;

recording means for writing necessary information included in the data signal into the inserted card; and control means for checking the identification code extracted from the data signal against the identification code read from the card, and controlling said recording means in accordance with the result of the check.

2. A multibroadcast receiver according to claim 1, further including external inputting means and wherein said control means checks data inputted from said external inputting means against predetermined data taken out of the data signal and records on the card the necessary information extracted from the data signal.

3. A multibroadcast receiver according to claim 1, wherein the data signal carried by the additive-information radio wave in the multibroadcasting radio wave includes a write instruction signal and a read instruction signal, said recording means and reading means being controlled by said controlling means in accordance with the write instruction signal and the read instruction signal.

4. A multibroadcast receiver according to claim 3, wherein said reading means comprises an optical reader, and said recording means comprises printing means and records the necessary information on the card by a two-dimensional code and characters.

5. A multibroadcast receiver according to claim 4, wherein said external inputting means is connected by wireless.

6. A multibroadcast receiver according to claim 5, wherein the card has thereon a preliminarily-printed post-card format with a space for entering an address and characters.

7. A multibroadcast receiver according to claim 3, wherein the card has thereon a preliminarily-printed post-card format with a space for entering an address and characters.

8. A multibroadcast receiver according to claim 4, wherein the card has thereon a preliminarily-printed post-card format with a space for entering an address and characters.

9. A multibroadcast receiver according to claim 2, wherein said reading means comprises an optical reader, and said recording means comprises printing means and records the necessary information on the card by a two-dimensional code and characters.

10. A multibroadcast receiver according to claim 9, wherein said external inputting means is connected by wireless.

11. A multibroadcast receiver according to claim 10, wherein the card has thereon a preliminarily-printed postcard-format with a space for entering an address and characters.

12. A multibroadcast receiver according to claim 9, wherein the card has thereon a preliminarily-printed post-card format with a space for entering an address and characters.

13. A multibroadcast receiver according to claim 3, wherein each of said reading means and said recording means comprises a magnetic reader" recorder and the card is a magnetic recording card.

14. A multibroadcast receiver according to claim 13, wherein said external inputting means is connected by wireless.

15. A multibroadcast receiver according to claim 14, wherein the card has thereon a preliminarily-printed post-card format with a space for entering an address and characters.

16. A multibroadcast receiver according to claim 13, wherein the card has thereon a preliminarily-printed post-card format with a space for entering an address and characters.

17. A multibroadcast receiver according to claim 1, wherein said reading means comprises an optical reader, and said recording means comprises printing means and records the necessary information on the card by a two-dimensional code and characters.

18. A multibroadcast receiver according to claim 17, wherein said external inputting means is connected by wireless.

19. A multibroadcast receiver according to claim 18, wherein the card has thereon a preliminarily-printed post-card format with a space for entering an address and characters.

20. A multibroadcast receiver according to claim 17, wherein the card has thereon a preliminarily-printed post-card format with a space for entering an address and characters.

21. A multibroadcast receiver according to claim 2, wherein each of said reading means and said recording means comprises a magnetic reader" recorder and the card is a magnetic recording card.

22. A multibroadcast receiver according to claim 21, wherein said external inputting means is connected by wireless.

23. A multibroadcast receiver according to claim 22, wherein the card has thereon a preliminarily-printed post-card format with a space for entering an address and characters.

24. A multibroadcast receiver according to claim 21, wherein the card has thereon a preliminarily-printed post-card format with a space for entering an address and characters.

25. A multibroadcast receiver according to claim 3, wherein said external inputting means is connected by wireless.

26. A multibroadcast receiver according to claim 25, wherein the card has thereon a preliminarily-printed post-card format with a space for entering an address and characters.

27. A multibroadcast receiver according to claim 2, wherein said external inputting means is connected by wireless.

28. A multibroadcast receiver according to claim 27, wherein the card has thereon a preliminarily-printed post-card format with a space for entering an address and characters.

29. A multibroadcast receiver according to claim 2, wherein the card has thereon a preliminarily-printed post-card format with a space for entering an address and characters.

30. A multibroadcast receiver according to claim 1, wherein each of said reading means and said recording means comprises a magnetic reader" recorder and the card is a magnetic recording card.

31. A multibroadcast receiver according to claim 30, wherein said external inputting means is connected by wireless.

32. A multibroadcast receiver according to claim 31, wherein the card has thereon a preliminarily-printed post-card format with a space for entering an address and characters.

33. A multibroadcast receiver according to claim 30, wherein the card has thereon a preliminarily-printed postcard format with a space for entering an address and characters.

34. A broadcast receiving system comprising: a broadcasting station for including and broadcasting an identification code related to the contents of a broadcasting program in a data signal carried by an additive-information radio wave in a multibroadcasting radio wave;

- a card having the identification code recorded thereon in advance;
- a multibroadcast receiver having an insert portion for inserting said card therethrough and constructed so that information necessary to identify the contents of the broadcasting program is extracted from the data signal based on the identification code recorded on said card and is recorded on said card; and
- card recovery locations scattered within a broadcasting area so as to recover said card;
- whereby high value-added information or physical services are provided at the card recovery locations based on the records on said card, while the records on said card which are collected through the card recovery locations, are used for statistical processing.

* * * * *